(No Model.)

J. H. FLICKINGER & L. F. GRAHAM.
FRUIT SLICER OR CUTTER.

No. 453,859. Patented June 9, 1891.

Witnesses.  Inventors.

United States Patent Office.

JOSEPH H. FLICKINGER AND LOZELLE F. GRAHAM, OF SAN JOSÉ, CALIFORNIA.

FRUIT SLICER OR CUTTER.

SPECIFICATION forming part of Letters Patent No. 453,859, dated June 9, 1891.

Application filed December 26, 1890. Serial No. 375,837. (No model.)

*To all whom it may concern:*

Be it known that we, JOSEPH H. FLICKINGER and LOZELLE F. GRAHAM, citizens of the United States, residing at San José, in the county of Santa Clara and State of California, have invented certain new and useful Improvements in Fruit Slicers or Cutters; and we do hereby declare the following to be a full, clear, and exact description of said invention, such as will enable others skilled in the art to which it most nearly appertains to make, use, and practice the same.

Figures 1, 2:
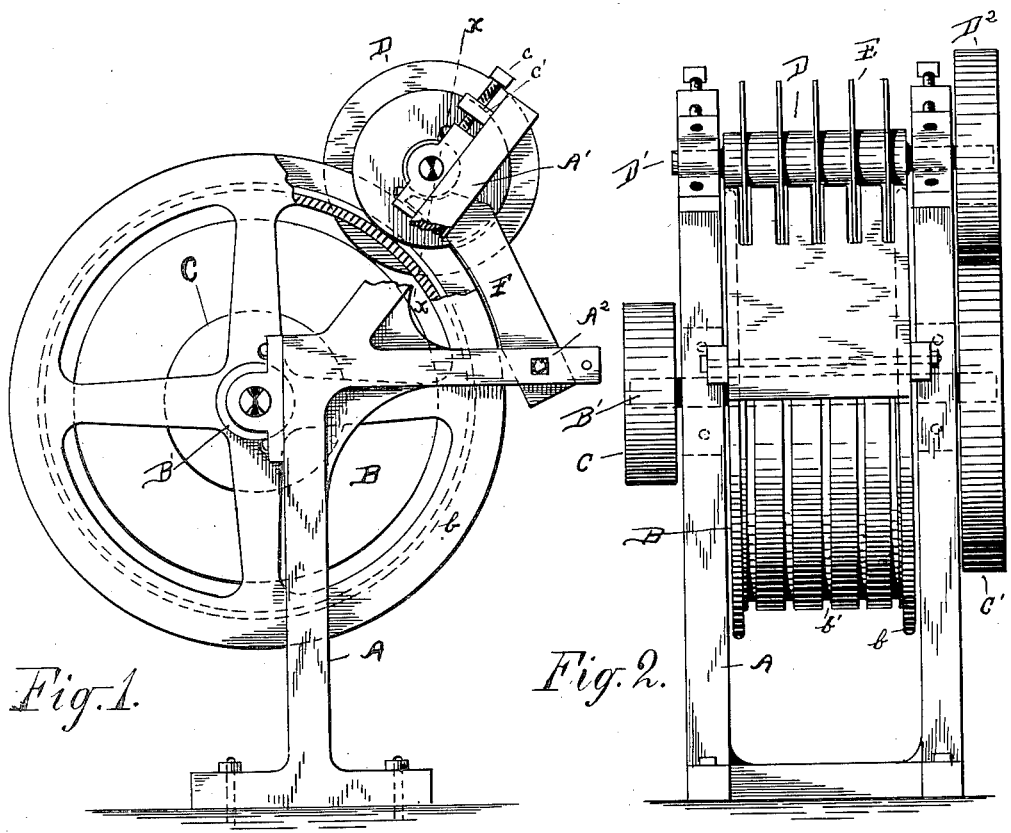
Figures 3, 4:
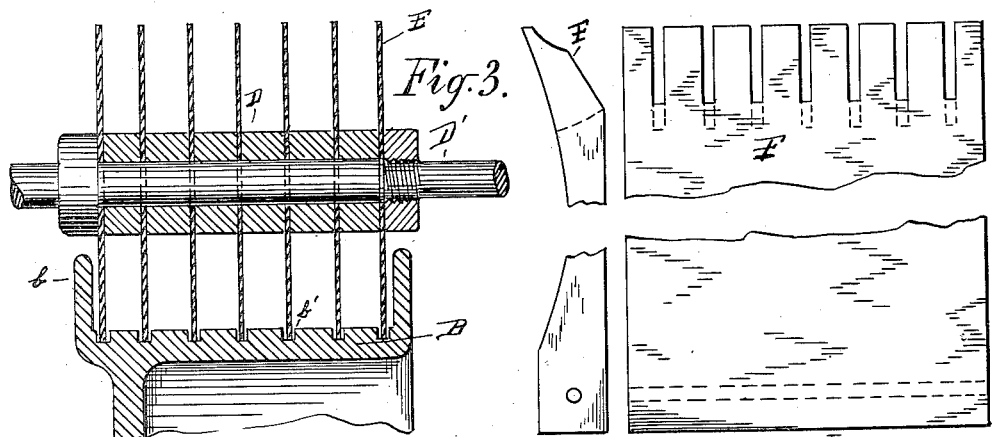

Referring to the drawings forming a part of this application, wherein similar letters of reference are used to denote corresponding parts throughout the entire specification and several views, Figure 1 is a side view in elevation; Fig. 2, a front view; Fig. 3, a broken top plan; and Fig. 4 shows side and edge views of the scraper.

In the drawings, the letter A is used to indicate the frame of the machine, upon which is mounted within suitable bearings the fruit-receiving wheel B, upon which the fruit is conveyed in any suitable manner—as, for instance, by means of a hopper (not shown) which may be located thereover. Said wheel is provided with the side flanges $b$, and the periphery thereof has formed therein a series of circular grooves $b'$, which may be any convenient distance apart, according to the size in which the fruit is to be cut. The wheel B is rigidly secured to shaft B', to one end of which we locate the power-wheel C, while on the other is attached the gear-wheel C'.

Any suitable machinery may be employed for imparting motion to the power-wheel C.

The frame A is provided with two outwardly-extending arms A' A², and within bearings formed in the upper one A' we secure the cutting-wheel D, so as to be located above and slightly in advance of the receiving-wheel B. To the outer periphery is secured the circular blades E, which in number correspond with the circular grooves $b'$, within which the ends thereof fit. The outer end of the shaft D' is provided with the gear-wheel D², which meshes with gear C'.

By means of the adjustable screw-rod $c$, which works through screw-threaded projection $c'$, we are enabled to adjust the cutting roll or wheel to or from the receiving-wheel as the fruit may necessitate.

In order to provide against the fruit clogging within or between the circular blades E, we provide the scraper F, (which is attached to the forwardly-extending arm A²,) which projects upwardly and is secured between the cutting-blades. Between each of the cutting-blades we secure one of the scrapers, which, besides answering to free the cutters from the clogging of sliced fruit, also serve as guides or chutes for the fruit. Without the use of the scrapers the fruit has a tendency to clog between the cutting-blades, and thus the blades require constant cleaning. Motion being conveyed to the power-wheel C, the shaft B' and wheel B will rotate therewith and through the medium of gear-wheel C' transmit motion to gear D², which in turn imparts the same to shaft and wheel D' and D. As the wheel B rotates the fruit is fed thereon in any suitable manner and carried thereby against the cutting-blades E, which, revolving in an opposite direction to wheel B, necessarily slice the fruit the required size. As the fruit passes between the cutting-blades the scrapers F force the same therefrom and cause the same to be guided to a table or basket located therebeneath to receive the same. (Not shown.) By providing the flanges $b$ the fruit is prevented from falling off the receiving-wheel B.

Having thus described our invention, what we claim as new, and desire to secure protection in by Letters Patent of the United States, is—

In a fruit-slicer, the combination, with the stand A, provided with outwardly-extending arms A' A², receiving-wheel mounted thereon, said wheel being provided with circular grooves and upwardly-extending flanges, adjustable cutting-wheel secured within bearings formed on arms A', and fruit-scrapers secured to arms A² and between the cutting-blades, of suitable mechanism for imparting motion to the receiving and cutting wheels, substantially as and for the purpose set forth and described.

In testimony whereof we affix our signatures in presence of two witnesses.

JOSEPH H. FLICKINGER.
LOZELLE F. GRAHAM.

Witnesses:
J. W. KEYS,
N. A. ACKER.